(12) United States Patent  
Needelman

(10) Patent No.: US 6,266,616 B1  
(45) Date of Patent: Jul. 24, 2001

(54) CONFUSED-IN-SPACE STELLAR ATTITUDE ACQUISITION USING MULTIPLE STAR TRACKERS

(75) Inventor: David D. Needelman, Torrance, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/454,424

(22) Filed: Dec. 3, 1999

(51) Int. Cl.$^7$ ................................ B64G 1/32; G05D 1/00
(52) U.S. Cl. ..................... 701/222; 701/13; 244/171
(58) Field of Search ........................ 701/13, 222, 226; 244/164, 171; 342/357.11; 702/151; 250/203.6; 356/139.01

(56) References Cited

U.S. PATENT DOCUMENTS 5,745,869 * 4/1998 Van Dezooijen .................. 701/222

* cited by examiner

Primary Examiner—Tan Nguyen  
(74) Attorney, Agent, or Firm—Gates & Cooper LLP

(57) ABSTRACT

A method, apparatus, article of manufacture for determining the attitude of a spacecraft having at least one star sensor. The method comprises the steps of preparing, for each star sensor, an associated star catalog having an entry describing star parameters for each star potentially observable by the star sensor. The determination of which stars are potentially observable by the star sensor is performed using an estimate of the satellite attitude. A correlation is then determined between the stars observed by each star sensor with the associated star catalog entries. A reference star sensor is selected as the star sensor tracking a primary star having the highest correlation between the stars observed by the star sensor and the entries in the star catalog associated with the star sensor. The spacecraft attitude is determined from the primary star and remaining star observations by the reference star sensor. Attitude estimates from the non-reference trackers are used to determine star sensor alignment. If sun sensor data is available, sun sensor alignment may be determined through an analogous method.

33 Claims, 8 Drawing Sheets

CONFUSED-IN-SPACE STELLAR ATTITUDE ACQUISITION USING MULTIPLE STAR TRACKERS

BACKGROUND OF THE INVENTION

1. Field of the Invention

The present invention relates to systems and methods for navigation and control of spacecraft, and in particular to a system and method for determining the attitude of a spacecraft having at least one star sensor.

2. Description of the Related Art

Satellites enjoy widespread use for a variety of applications, including communications, surveillance, and data gathering. To perform their design mission, most satellites require accurate information regarding the spacecraft and payload attitude.

For applications where high bandwidth satellite attitude data is required, such data is typically obtained by on-board inertial measurement instruments such as inertial reference units having a plurality of gyros and accelerometers. However, while such instruments can provide high bandwidth information regarding the spacecraft attitude, they can only do so with respect to a datum attitude reference. Errors in this attitude reference propagate throughout the satellite navigation system. At the same time, it occasionally occurs that satellites lose their attitude reference, and must reacquire the reference with on-board sensors such as sun and earth sensors. When the satellite's attitude datum has been entirely lost (a lost-in-space-scenario), the satellite must determine its attitude reference completely anew. When the accuracy of the attitude datum has been compromised, but not lost, (a confused-in-space scenario), the satellite must also determine its attitude reference anew.

Most attitude acquisition algorithms assume a "Lost-in-Space" problem, which use no a priori attitude-related knowledge, and use a single star tracker to estimate the satellite attitude. Such "Lost-in-Space" algorithms can take a substantial amount processing capacity and memory. Unfortunately, current attitude acquisition algorithms have no capability to relax memory or processing requirements when attitude-related information is supplied, or deal with multiple star trackers. For example, the system disclosed U.S. Pat. No. 5,745,869, issued to van Bezooijen on Apr. 28, 1998 is designed to work with data from a single star tracker, and assumes a lack of a priori satellite attitude information.

Further, many acquisition algorithms are designed to work with "smart" star trackers that are capable of using a built-in star catalog to determine which star is being tracked. Such an algorithm is disclosed in U.S. Pat. No. 5,412,574, issued to Bender, Parks, and Brozenec on May 2, 1995. Such systems cannot utilize minimum capability star trackers, such as the CT-602 available from the BALL CORPORATION, which can only identify star positions (in the star tracker reference frame) and corresponding star instrument magnitudes.

Hence, there is a need for a device and method for estimating the attitude of a spacecraft using supplied a priori information and information from multiple star trackers. The present invention satisfies that need.

SUMMARY OF THE INVENTION

To address the requirements described above, the present invention discloses a method, apparatus, article of manufacture for determining the attitude of a spacecraft having at least one star sensor.

The method comprises the steps of preparing, for each star sensor, an associated star catalog having an entry describing star parameters for each star potentially observable by the star sensor. The determination of which stars are potentially observable by the star tracker is performed using the supplied a priori attitude-related information. An identification is then determined between the stars observed by each star sensor with the associated star catalog entries. The set of identifications for each tracker is referred to as the "correlation" between the star observations from each star sensor and the associated star catalog entries. A reference star tracker is selected as the star tracker tracking the largest number of identified stars. (In the event of a tie, the reference star tracker is selected as the tracker tracking the stars with the greatest spread). Finally, the spacecraft attitude is determined from the stars identified by the reference star sensor. The apparatus comprises a means for performing the foregoing operations, and the article of manufacture comprises a data storage device tangibly embodying instructions to perform the method steps described above.

Thus, the present invention has several advantages over the prior art.

First, while the present invention may work with data from a single star tracker, it is designed to accept and use data from multiple star trackers, if observations from more than one tracker are available. If such is the case, the present invention can produce an estimate of the misalignment of each tracker, and, in certain cases, an estimate of the misalignment of the sun sensor, with respect to one "reference" tracker, in addition to the attitude estimate.

Second, the present invention does not assume a lack of a priori attitude knowledge. Instead, this a priori attitude knowledge is used to efficiently arrive at an accurate spacecraft attitude estimate.

Third, the present invention allows the use of lower capability star trackers that can only identify star position (in the tracker frame) and star instrument magnitude.

Fourth, the present invention is flexible in its requirements for a priori attitude knowledge. It can function with either a known point-of-reference (typically, the position of the sun), or a rough estimate of the attitude, supplied. It is an improvement over the technique of Bender et al, which assumes the position of the Earth as a point of reference.

And finally, the present invention has modest memory requirements; the size of the star catalog involved is about 75 kilobytes.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
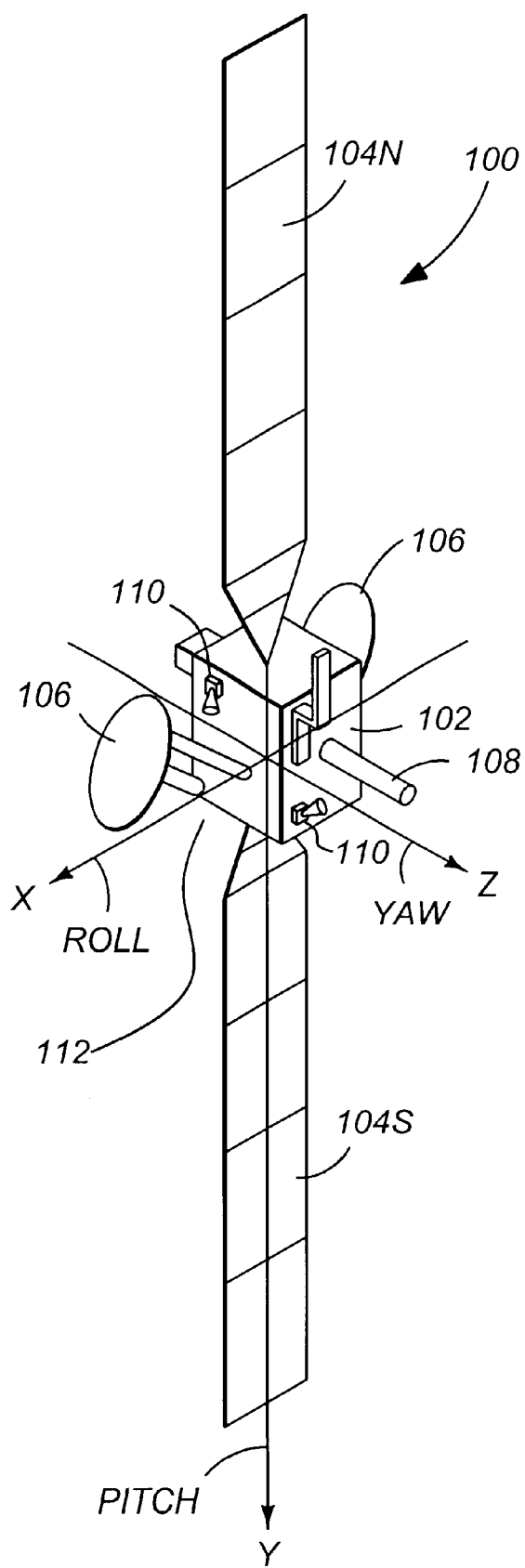
FIG. 1 illustrates a three-axis stabilized satellite or spacecraft.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omnidirectional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

FIG. 1 also illustrates the spacecraft 100 reference frame 112. This reference frame 112 is a body-fixed, non-inertial frame defined so that an object attached to the spacecraft body 102 has an essentially constant position with respect to that frame, regardless of how its position changes in other reference frames to another reference frame such as an earth-centered inertial (ECI) reference frame. The attitude is the orientation of the body-fixed frame with respect to an inertial frame.

The Y (pitch) axis is chosen to be parallel to the solar panel 104 longitudinal axis. The solar panels 104 are designed to rotate about that axis, but the axis itself is typically fixed in the body frame. The X and Z axes are normal to faces of the spacecraft body 102. The X axis, which typically "points" in the direction of spacecraft 100 motion, is the roll axis and the Z axis, which typically "points" to Earth, is the yaw axis. As this frame is body-fixed, even if the spacecraft 100 is at an orientation where the X and Z axes are not pointing in the direction of motion, and Earth 302, respectively, the axes do not change. They are still defined as in FIG. 1.

Figure 2:
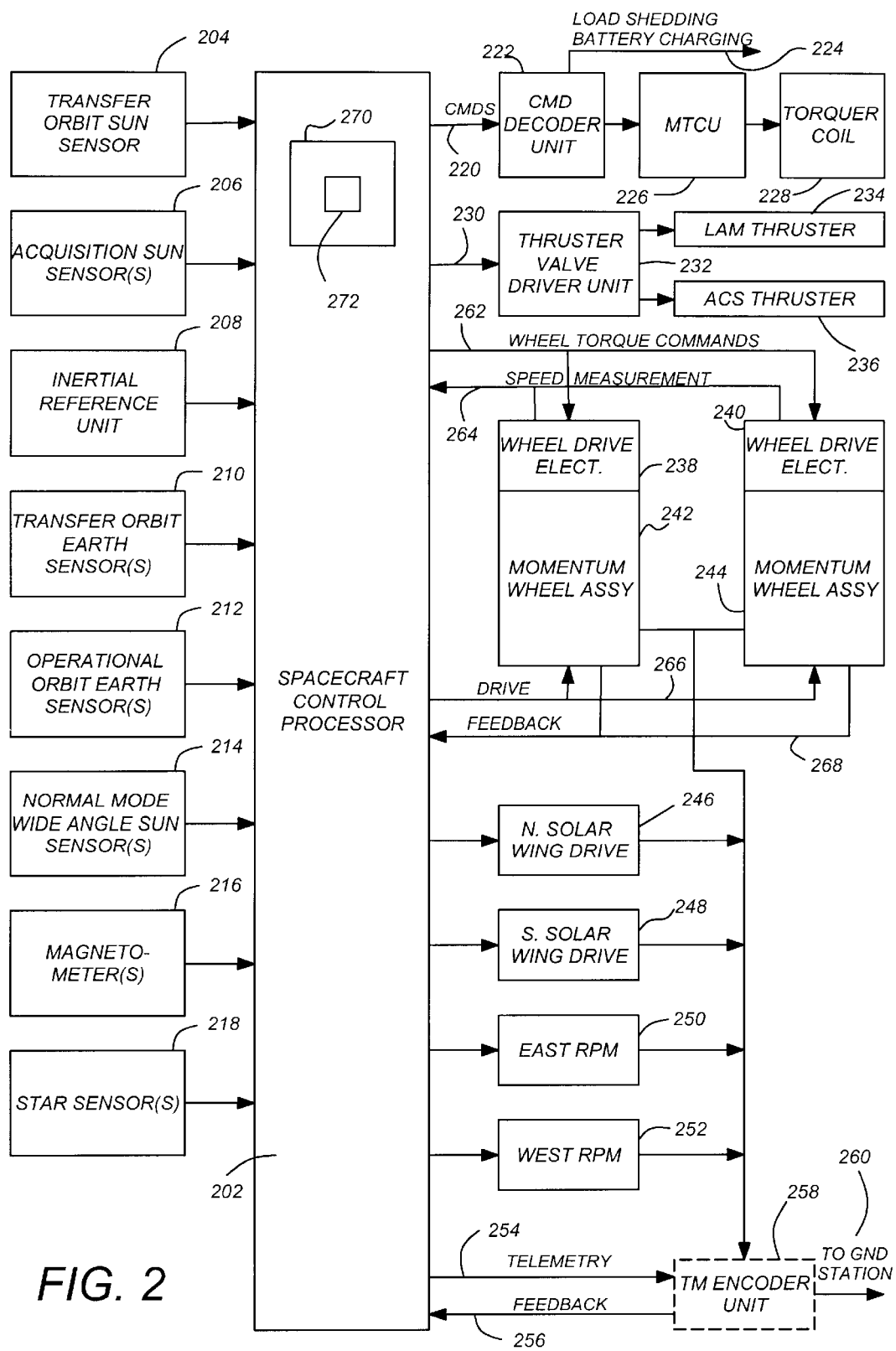
FIG. 2 is a diagram depicting the functional architecture of a representative attitude control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, station keeping control, normal mode control, mechanisms control, fault protection, and spacecraft systems support, among others. The post ejection sequencing could include initializing to ascent mode and thruster active notation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The station keeping control could include auto mode sequencing, gyro calibration, station keeping attitude control and transition to normal. The normal mode control could include attitude estimation, attitude and solar array steering, momentum bias control, magnetic torquing, and thruster momentum dumping (H-dumping). The mechanism mode control could include solar panel control and reflector positioning control. The spacecraft control systems support could include tracking and command processing, battery charge management and pressure transducer processing.

Input to the spacecraft control processor 202 may come from a any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 that are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor 202. The signals 268 are also sent to the telemetry encoder unit 258 and in turn to the ground station 260.

The spacecraft control processor also sends command signals 254 to the telemetry encoder unit 258 that in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260. Data received may also be received by the telemetry encoder unit 258 from the ground station 260 and passed to the SCP 202.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 10 or on the ground), thereby making a computer program product or article of manufacture according to the invention. As such, the terms "program storage device," "article of manufacture" and "computer program product" as used herein are intended to encompass a computer program accessible from any computer readable device or media.

Reference Frames Used in Attitude Determination

Spacecraft attitude is the orientation of the spacecraft 100 with respect to some known reference frame.

One possible reference frame is fixed with respect to both the Earth 302 and the Sun 304. This reference frame is useful because the satellite's mission is usually concerned primarily with pointing antennae at the Earth 302, and directing the solar panels 104 to at the Sun 304. Attitude determination in such a frame requires finding where the centers of the sun and Earth are with respect to the spacecraft.

One problem with using such a reference frame is that it is hard to determine exactly where the center of the sun and/or Earth is with respect to a spacecraft at any given time. Sun sensors 214 and earth sensors 212, which are used for such purposes, give errors of approximately 0.02 degree and 0.05 degree, respectively. Hence, attitude estimates based on such readings will be off by 0.02 degree, or more. In many cases, this accuracy is insufficient to meet current satellite mission requirements.

The attitude of the spacecraft can also be expressed in accordance with an inertial reference frame. The attitude of the spacecraft 100 in an inertial reference frame can be determined directly from the observation of inertially fixed objects, such as stars, instead of moving objects such as the Sun and Earth. Because a typical star sensor 218 is accurate to about 15 arc-seconds (0.004 degree), attitude estimates formulated using star trackers are more accurate than estimates formulated using conventional Sun and Earth sensors 214 and 212. Once the spacecraft attitude is known in the inertial reference frame, the orbital information of the spacecraft, the Sun, and the Earth can be used to compute the angular positions of the Sun and the Earth relative to the satellite 100.

Figure 3:
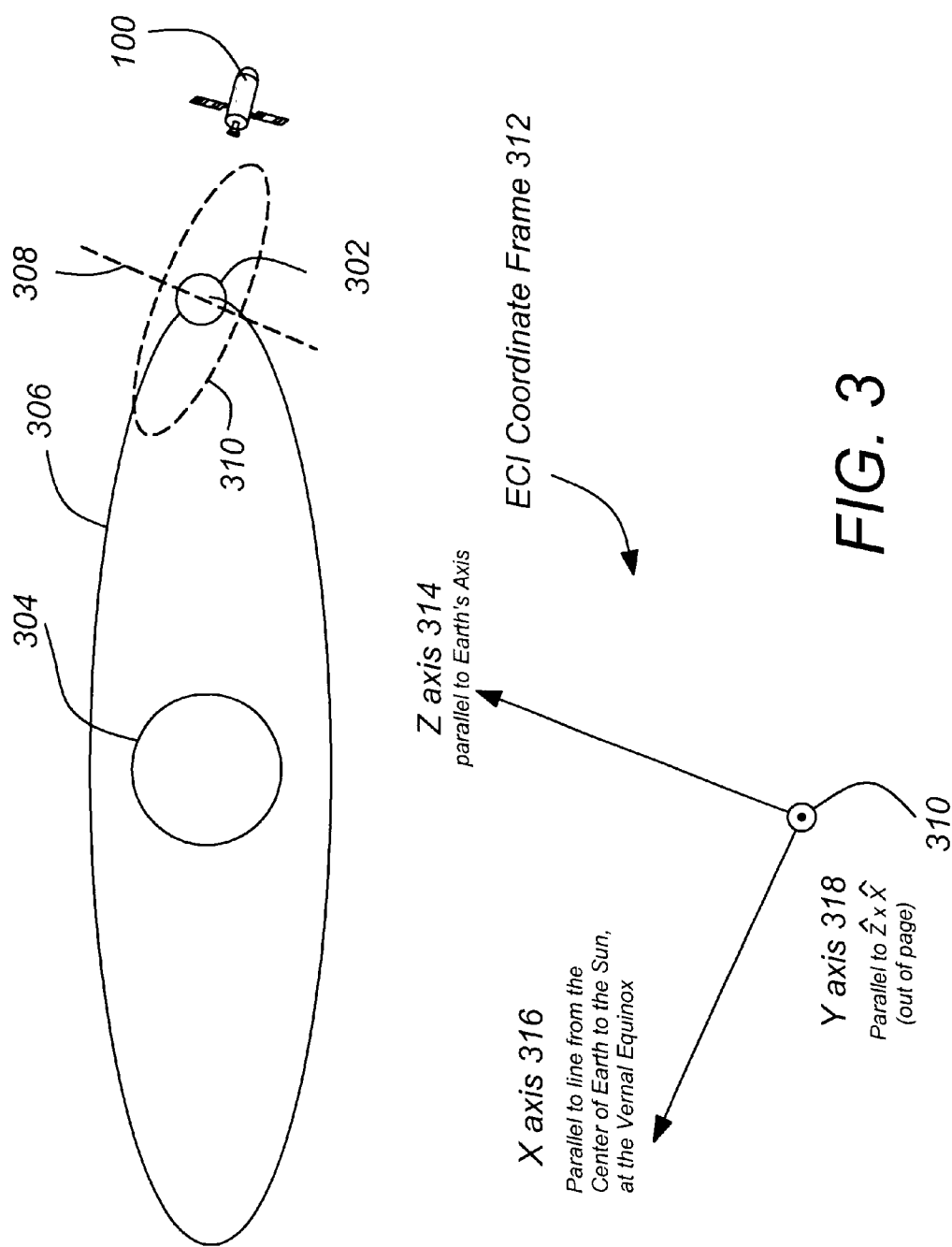
FIG. 3 is a diagram showing an Earth-Centered Inertial (ECI) reference frame.

FIG. 3 is a diagram showing an Earth-Centered Inertial (ECI) reference frame 312 used for one embodiment of the Confused-in-Space Stellar Attitude Acquisition (CISSAA) method described herein. The origin 310 of the ECI reference frame 312 (where the X axis 316, the Y axis 318, and the Z axis 314 meet) is defined at the current position of the satellite 100. The position of the origin changes in time, but the orientation of axes 314–318 do not. The Z-axis 314 is taken to be parallel to Earth's spin axis 302, pointing north. The X and Y axes are perpendicular to the Z-axis 314, and are therefore parallel to vectors lying in Earth's 302 equatorial plane 310. The X-axis 316 is chosen to be parallel to a line lying in the plane of the ecliptic 306 (the plane containing the orbits of the planets), as well as the equatorial plane. The X axis 316 can be defined as the line from the center of the Earth 302 to the Sun 304 at the vernal equinox (March 21). The stars' positions in this frame are referenced by unit vectors pointing from the spacecraft 100 to the star. Throughout this disclosure, all vectors are taken to be of unit length, unless specified otherwise.

The star positions are nearly fixed in the ECI reference frame 312.

Since the origin of the frame is at the spacecraft position, spacecraft motion affects ECI position of the stars. However, in practice, the stars are far enough away so that the unit vectors remain essentially constant as the spacecraft moves. The above definition of the ECI reference frame 312 also ignores the fact that the orientation of Earth's axis changes over time. This is because the Earth precession period is about 26,000 years. Therefore, the axes 314–318 of the ECI reference frame 310 is often specified with respect to a particular time (e.g., noon, Jan. 1, 2000).

Figure 4:
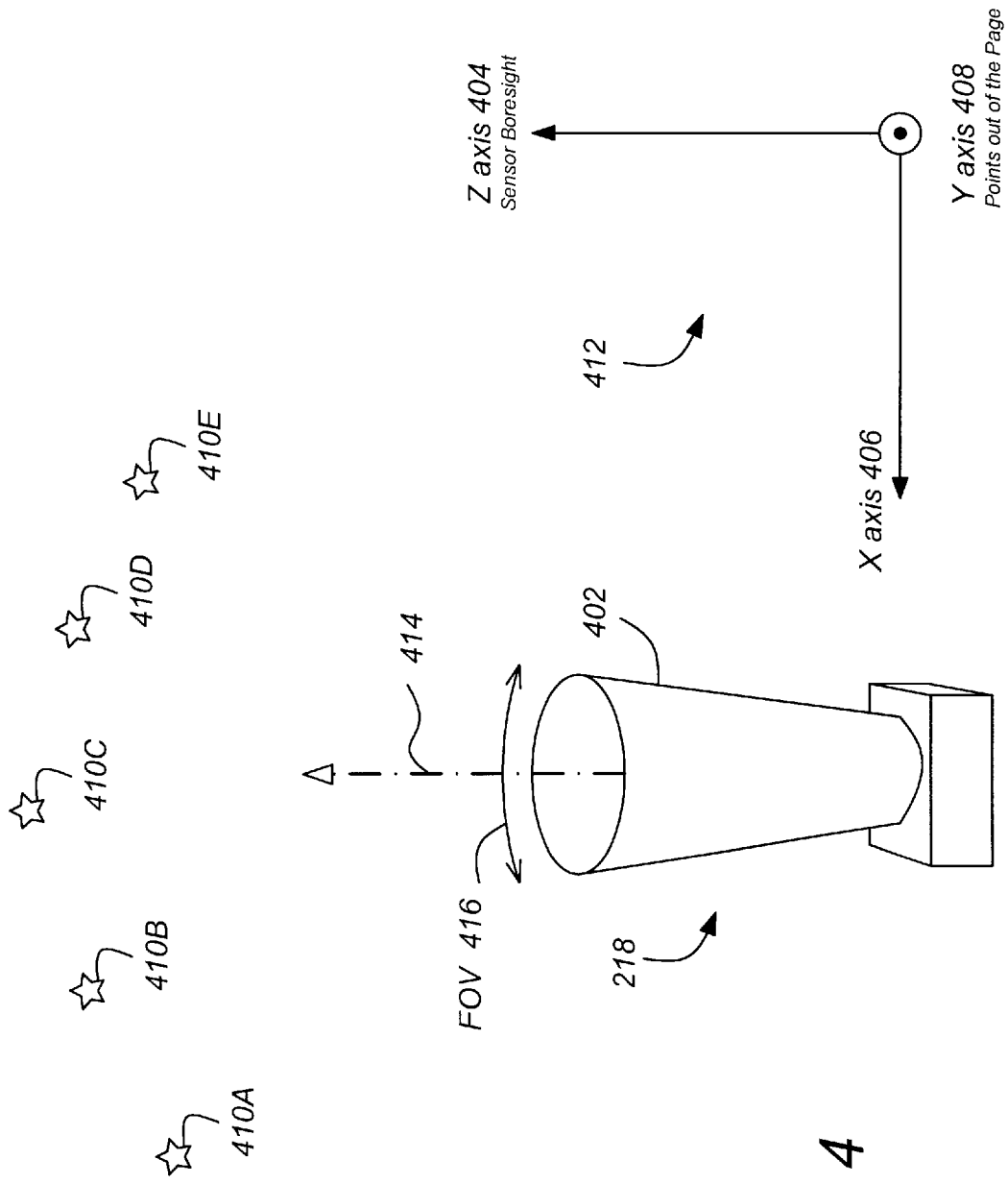
FIG. 4 is a diagram showing a reference frame for a typical star sensor.

FIG. 4 is a diagram showing a reference frame for a typical star sensor 218 and sun shade 402. In most cases, star sensors 218 (hereinafter alternatively referred to as star trackers) make star observations with respect to a body-fixed reference frame pertaining to the star tracker only. A star tracker is a star sensor 218 that can provide star position and magnitude information for several ($N^{tight}_{local}$) stars simultaneously, in a spacecraft body-fixed reference frame (for example, a star tracker reference frame). A star tracker 218 can simultaneously track up to $N_{max}$ stars, where $N_{max}$ depends on the tracker used; $N_{max}$ ranges from one to about five. The star tracker 218 reports stars 410A–410E at Cartesian coordinate positions ($x_1$, $y_1$) through ($x_{Nmax}$, $y_{Nmax}$) in the star tracker's field-of-view (FOV) 416. These (x,y) positions may be converted to unit vectors, expressed in the star tracker's reference frame 412. For trackers with a relatively small FOV 416 (typically, about 8 degrees by 8 degrees), any star position reported by the star tracker 218 will be translated to a unit vector with the Z-component close to, but just less than, one. The star tracker 218 reports the stars' magnitudes, in addition to their positions.

If the star tracker 218 is rigidly attached to the spacecraft body 102, the star tracker reference frame 412 is another type of spacecraft body-fixed frame. Neglecting launch vibration, and or cumulative thermal deformation, a time-invariant transformation between the spacecraft body-fixed frame and the star tracker reference frame 412, can be defined. This transformation is typically expressed in terms of a direction cosine matrix.

The true attitude of the spacecraft 100 (which is unknown) can be represented by a 3×3 direction cosine matrix $DCM_{eci \rightarrow body}$, wherein "ECI" or "eci" denotes the Earth-Centered Inertial reference frame 312, with origin 310 corresponding to the spacecraft 100 location. The spacecraft body reference frame 112 is taken to be a spacecraft body-fixed frame, defined by the orientation of a "reference" star tracker.

An arbitrary position expressed as a 3-element vector, $v_{body}$, defined with respect to the body reference frame 112 will correspond to a 3-element vector, $v_{eci}$, defined with respect to the ECI frame, when $v_{body} = DCM_{eci \to body} v_{eci}$. If any direction cosine matrix, $DCM_{A \to B}$, is known, then its inverse, $DCM_{B \to A}$, is also known, and is equal to the transpose of $DCM_{A \to B}$.

Consider a spacecraft 100 having NumST star trackers 218 (NumST≧1), each tracking at least one star 410. A reference frame 412 can be associated with each star tracker 218, and this reference frame 412 can be used to describe the reported position of each star 410 sensed by the star tracker 218. For each star tracker 218, a nearly temporally constant orientation of the star tracker reference frame 412 can be described with respect to the spacecraft body frame 112. This orientation can be represented by the direction cosine matrix $DCM^A_{tracker \to body}$, wherein 1≦tracker≦NumST.

This value, can be obtained from pre-launch measurements, if confused-in-space stellar attitude acquisition is run during initialization, or from previous usage of CISSAA, if available. The spacecraft body reference frame 112 is defined by the assumed orientation of one of the star trackers 218, designated as the "reference" star tracker.

$DCM^A_{tracker \to body}$, wherein 1≦tracker≦NumST is an approximation of the "true" tracker orientation (which depends on which tracker is chosen to be reference), $DCM_{tracker \to body}$. Because of star tracker 402 orientation misalignment errors, there will be a difference between the spacecraft body frame 112 and the assumed orientation, typically about 0.15 degrees. This difference $\epsilon_C$, can be described by the relation $\epsilon_C \geq a\ cos\ (DCM_{tracker \to body} v \cdot DCM^A_{tracker \to body} v)$, for any arbitrary unit vector v. The function "a cos(•)" returns a value in the range [0°, 180°].

The confused-in-space stellar attitude acquisition process accepts star tracker data, a star catalog, and attitude related information as input. The star tracker data includes the star position in the star tracker FOV 416, and the star magnitude. The acquisition star catalog (ASC) includes a plurality of entries, each of which represents a star. Each entry includes, for example, the right ascension and declination of the star in the ECI reference frame 312, and the instrument magnitude (predicted star magnitude, as measured by the instrument). The star catalog may also include the star's spectral class and sub-class. The attitude-related information includes, for example, the position of the Sun in the ECI reference frame 312, and knowledge that the sun sensor's line of sight is directed at the Sun to within $\epsilon^A_S$, or a rough estimate of the spacecraft attitude, to within $\epsilon^A$.

From this information, the present invention computes the following:

(1) An index, st, of the star 402 tracker designated to be the "reference tracker." This defines the body frame through $DCM^A_{st \to body}$;

(2) The centroid of the identified stars tracked by st, expressed in the body frame, $\mu_{body}$;

(3) An attitude estimate, represented by a direction cosine matrix $DCM'_{eci \to body}$;

(4) The error in the attitude estimate;

(4a) $\epsilon_\perp$, the estimated error about an axis perpendicular to $\mu_{body}$;

(4b) $\epsilon_\parallel$, the estimated upper bound on the error about an axis parallel to $\mu_{body}$;

(5) Alignment matrices for each tracker, which define the trackers' orientations, $DCM'_{tracker \to body}$; and (6) A list of identified stars tracked by each tracker. (Note: for the reference tracker, and for trackers not tracking a sufficient number of well-distributed stars, $DCM'_{tracker \to body} = DCM^A_{tracker \to body}$).

CISSAA computes the body-referenced and ECI referenced locations of two separate "reference" points to produce a first approximation of the attitude estimate. The first reference point is determined through a succession of guesses. Each guess is a "primary assumption"—that a particular star tracked by a star tracker 218 (termed the "primary" star, at a position represented by a vector $P_{st}$, defined with respect to the star tracker frame) corresponds to a particular entry in the star catalog (the "primary candidate," at a position represented by a vector $C_{eci}$, defined with respect to the ECI frame). Each guess is followed by tests, designed to validate, or invalidate, the guess.

The original attitude-related information supplied is used to determine a second reference point. In making this determination, CISSAA uses initially-supplied information, which can include, for example, knowledge of the Sun 304 position with respect to both the spacecraft body and ECI frames, or a rough estimate of the attitude of the spacecraft 100. For the former, CISSAA is said to be used in "sun position knowledge" mode; for the latter, CISSAA is said to be used in "rough attitude knowledge" mode.

Sun Position Knowledge: An (unknown) spacecraft 100 body-fixed reference vector, $S_{body}$, must correspond to $S_{eci}$, a (known) vector fixed in the ECI frame 312. That is:

$$S_{body} = DCM_{eci \to body} S_{eci} \quad (1)$$

A vector $S^A_{body}$ is known; $S^A_{body}$ is an approximation of $S_{body}$, to within $\epsilon^A_S$. That is, the following relationship applies:

$$a\ cos(S_{body} \cdot S^A_{body}) \leq E^A_S \quad (2)$$

For the applications discussed herein, this condition will apply when the spacecraft 100 is in sun-hold mode (i.e., the sun sensor 214 line-of-sight is kept pointing at the Sun). $S_{body}$ and $S_{eci}$ correspond to the direction of the sun, expressed in the spacecraft 100 body-fixed 112 and ECI reference frames 312, respectively. $S^A_{body}$ is the sun sensor 214 line-of-sight. The sum of the sun sensor 214 line-of-sight orientation error and the sun pointing control error, $\epsilon^A_S$ is between about 0.1° and 1°.

When Sun position knowledge is used with CISSAA, the second reference point is $S^A_{body} \leftrightarrow S_{eci}$, where the symbol "↔" denotes that the position vectors on either side of the symbol represent the same point, expressed in two different reference frames.

Rough Attitude Knowledge: An estimate, $DCM^A_{eci \to body}$, of the (unknown) true attitude, $DCM_{eci \to body}$, known to be accurate to within $\epsilon^A$ ($\epsilon^A \sim 10°$), may be available, in place of sun position knowledge. That is, for any unit vector v, $$a\ cos(DCM^A_{eci \to body} v \cdot DCM_{eci \to body} v) \leq \epsilon^A \quad (3)$$

Equivalently, the true spacecraft 100 attitude, represented by $DCM_{eci \to body}$, may be obtained from the initial attitude estimate, represented by $DCM^A_{eci \to body}$, by a rotation through an (unknown) angle $\phi$, where $|\phi| \leq \epsilon^A$, about an (unknown) axis.

Given the primary assumption, that $P_{body}$ corresponds to $C_{eci}$, $DCM_{eci \to body}$ may be obtained from $DCM^A_{eci \to body}$ through two rotations.

First, $DCM^A_{eci \to body}$ is rotated through angle $\epsilon^B$ about axis $a_{body} = (DCM^A_{eci \to body} C_{eci}) \times P_{body}$. This rotation is designed to be the minimal rotation mapping $DCM^A_{eci \to body}$ $C_{eci}$ to $P_{body}$. The direction cosine matrix obtained from such a rotation as is referred to as $DCM^B_{eci \to body}$. $DCM^B_{eci \to body}$ and is the first approximation of the attitude estimate described above. This rotation is followed by a rotation, through angle $\epsilon^B$, about axis $P_{body}$.

It can be shown that $(\epsilon^A)^2 \geq (\epsilon^B)^2 + (\epsilon^C)^2$. $DCM^B_{eci \to body}$ is a more accurate estimate than $DCM^A_{eci \to body}$, bounded by error angle $\epsilon^B \leq$ error angle bound $\epsilon^A$. More important, $\epsilon^B$ represents an error about a known axis, $P_{body}$, as opposed to $\epsilon^A$ representing an error about an unknown axis.

For CISSAA, used with rough attitude knowledge, the second reference point can be determined as $a_{body} \leftrightarrow DCM^A_{body \to eci} \, a_{body}$. CISSAA can be used even when no a priori attitude information is available, the user can employ CISSAA, with $\epsilon^A$ set to 180°.

Regardless of mode, acquisition proceeds through maneuvering the spacecraft 100 in such a way that at least $N_{local}$ stars are being tracked by at least one tracker, st (which will be the reference tracker), and a total of at least $N_{total}$ stars are being tracked by all the trackers.

Defining the positions of the stars tracked by star tracker st in the tracker FOV as $(X_{st}^i, Y_{st}^i)$ ($1 \leq i \leq N_{local}$), and given a subset consisting of M of st's tracked stars at positions $(X'^j_{st}, Y'^j_{st})$ ($1 \leq a \leq M \leq N_{local}$), the centroid position of the subset as the mean of the stars' positions can be defined as $$(\mu_x, \mu_y) = \frac{1}{M} \sum_{j=1}^{M} (X'^j_{st}, Y'^j_{st}) \qquad (4)$$

Using $\sigma$, the absolute value of the standard deviation of the stars' positions:

$$\sigma_x^2 = \frac{1}{M} \sum_{j=1}^{M} (X'^j_{st} - \mu_x)^2$$

$$\sigma_y^2 = \frac{1}{M} \sum_{j=1}^{M} (Y'^j_{st} - \mu_y)^2$$

$$\sigma^2 = \sigma_x^2 + \sigma_y^2$$

Defining the "spread" of the stars, $\rho$, to be as follows:

$$\rho^2 \equiv M(\sigma_x^2 + \sigma_y^2) = \sum_{j=1}^{M} \left[ (X'^j_{st} - \mu_x)^2 + (Y'^j_{st} - \mu_y)^2 \right] \qquad (5)$$

A reference frame may be defined, with respect to st, in which the tracked stars are at st-referenced positions $T_{st}^i = (a \tan(X_{st}^i), a \tan(Y_{st}^i), 1)/\|(a \tan(X_{st}^i), a \tan(Y_{st}^i), 1)\|$.

Using the assumed alignment of st, a mapping of tracker-referenced vectors to body frame-referenced vectors may be characterized with the direction cosine matrix $DCM_{st \to body}$. From this, it is possible to characterize st's tracked stars in the body frame as $T_{body}^i = DCM_{st \to body} \, T_{st}^i$.

CISSAA is used to match tracked stars to entries in the star catalog. Assuming $N'_{local}$ of the $N_{local}$ tracked stars are identified; these stars are at body-referenced positions $T_{body}^j$, ($1 \leq j \leq N'_{local}$) to their ECI equivalents (from the ASC), $T'^j_{eci}$, ($1 \leq j \leq N'_{local}$) an attitude estimate, $DCM'_{eci \to body}$ may be obtained. If $(\mu_x, \mu_y)$ are defined as the centroid of the identified stars, the centroid position corresponds to the tracker-referenced vector $\mu_{st}$, which, in turn, corresponds to the body-referenced vector $\mu_{body}$.

The error in estimated attitude may be divided into two components; one a rotation about an axis perpendicular to $\mu_{body}, \epsilon_\perp$; the other a rotation about an axis parallel to $\mu_{body}$; The former may be estimated using the difference between the ECI-referenced star positions from the ASC, and the predicted positions using tracker data and the attitude estimate:

$$\epsilon_\perp^2 = \frac{1}{N'_{local}} \sum_{j=1}^{local} |DCM'_{eci \to body} T'^j_{eci} - T'^j_{body}|^2 \qquad (6)$$

The error about the axis parallel to $\mu_{body}$ cannot be estimated in a similar fashion, as error in the predicted ECI positions of tracked stars is correlated far more strongly with rotation about an axis perpendicular to $\mu_{body}$ than to one parallel to $\mu_{body}$. An estimate of the upper bound on this error, $\epsilon_\|$, is:

$$\epsilon_\| = \frac{\epsilon_T}{\sigma \sqrt{N'_{local}}} = \frac{\epsilon_T}{\rho} \qquad (7)$$

where $\epsilon_T$ is the inherent error in tracker-reported star positions (typically about 15 arc-seconds).

Because of possible tracker misalignment, attitude estimates are calculated using star positions reported from a single tracker, the reference tracker. However, data from other trackers comes in to play in the effort to validate the estimate, by helping to establish a threshold number of star identifications. Therefore, during CISSAA processing, the direction cosine matrix of interest is $DCM_{eci \to tracker}$ ($1 \leq$ tracker $\leq$ NumST), as opposed to $DCM_{eci \to body}$.

Figure 5:
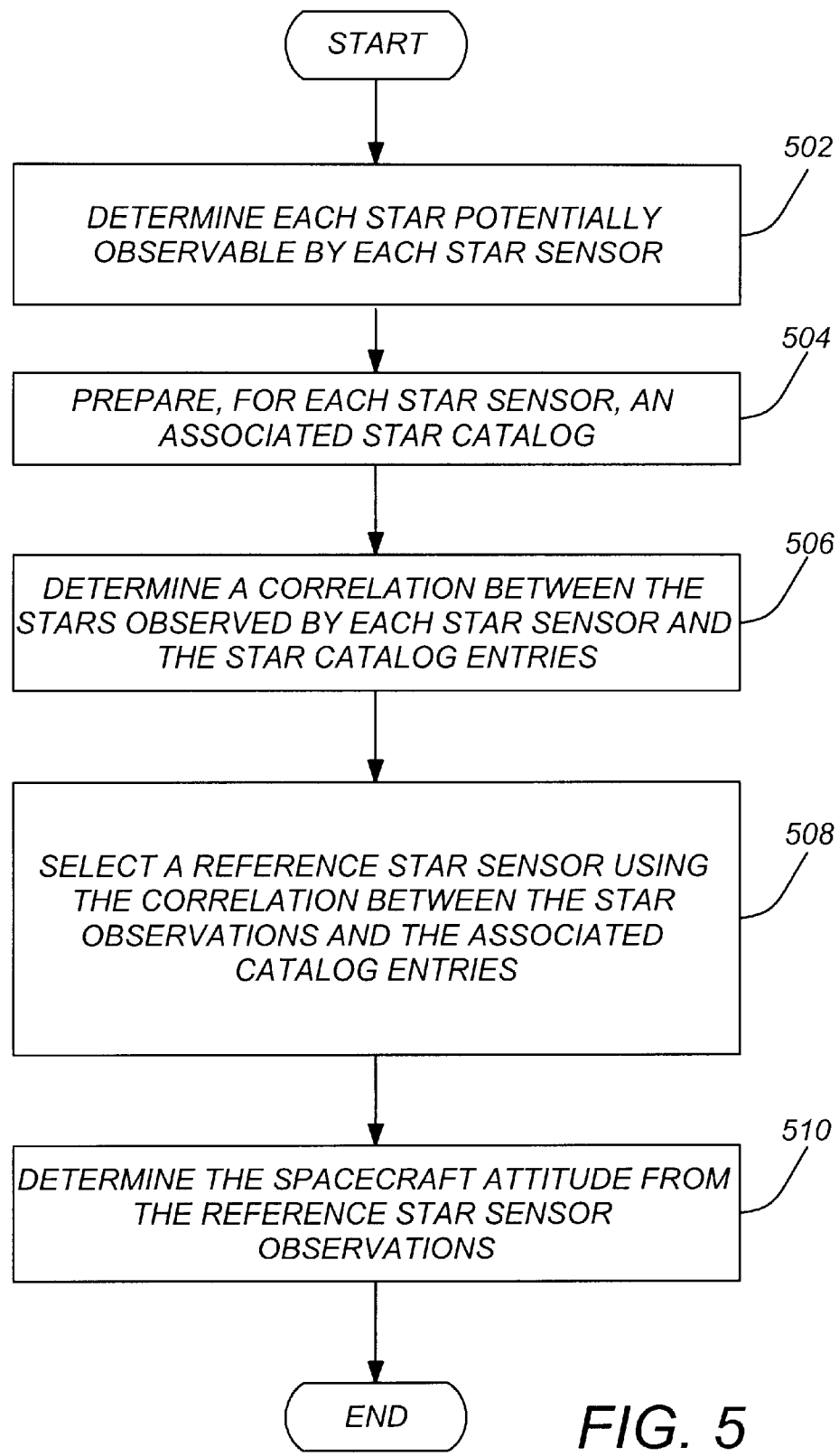
FIG. 5 is a flow chart presenting illustrative method steps used to practice the present invention.

FIG. 5 is a flow chart presenting illustrative method steps used to practice the present invention. First, each ASC star potentially observable by each star sensor is identified, as shown in block 502. Stars which are potentially observable are those which may be within the star sensor's field of view 416, based on the a priori attitude-related information. For example, if sun position knowledge in the body and ECI frames is supplied, an ASC entry corresponds to a potentially observable star if the following condition is satisfied: the angular separation between the sun and the ASC entry (as calculated in the ECI frame) matches the angular separation between the sun and some point in the star tracker FOV 416 (as calculated in the body frame), to within a given tolerance. (This tolerance depends on various factors, primarily the possible error in determination of the sun position). A spacecraft 100 attitude estimator can be used to derive a rough spacecraft attitude estimate. This estimate can be obtained, for example, from processed ground measurements and/or inertial device measurements. The potentially observable stars are those within the FOV 416 of the star tracker (again to within a given tolerance), based on the attitude estimate, and the (known) tracker 218 orientation with respect to the spacecraft. The tolerance primarily depends on the possible error in the attitude estimate.

A star sub-catalog (SSC), a subset of the ASC, is prepared for each star sensor, as shown in block 504. The SSC corresponding to star sensor i is hereinafter denoted as $SSC_i$, wherein $1 \leq i \leq$ NumST, and NumST is the number of star trackers tracking at least one star. $SSC_i$ entries are ASC entries corresponding to stars potentially observable by star sensor i. In one embodiment, the entries in each SSC are ordered by magnitude, with brightest stars (lowest magnitude values) first. In one embodiment, each of the SSCs is generated using available attitude-related information. This attitude-related information can be derived from Sun position information from a sun sensor or rough attitude knowledge). Each SSC includes entries having (preferably ECI-referenced) star positions, instrument magnitudes, and (if necessary) class information, for all the stars in the star catalog that could be visible to the tracker, given the attitude-related information.

Given sun-position knowledge, each $SSC_i$ will contain all star catalog stars within an annulus on the celestial sphere. The "radius" of this annulus is the maximum possible (given alignment errors) angular separation between the sun sensor line-of-sight $S^A{}_{body}$, and the tracker boresight, $Bore_{i,body}$. The width of the annulus will depend on the tracker field of view geometry, and the location of $S^A{}_{body}$.

Given rough attitude knowledge, an SSC comprises an entry for all star catalog stars within $\lambda$ of the rough attitude estimate of the ECI position corresponding to the star sensor boresight 414, $DCM^A{}_{body\rightarrow eci}Bore_{i,body}$. If $\theta$ is defined as the angular separation between the star sensor boresight 414 and the point in the tracker star sensor FOV 416 farthest from the boresight, then $\lambda=\min(180°, \theta+\epsilon^A)$.

If rough attitude knowledge mode is used with no a priori attitude knowledge, $\epsilon^A=\lambda=180$ degrees. In this case, entries in all the SSCs are all of the entries of the ASC.

For the data from a star tracker to be useful for attitude determination, the spread of stars must be adequate. Since the spread $\rho$ is related to one component of attitude error, $\epsilon_{\|}$, the accuracy of the attitude determination can be improved by assuring that the spread of observed stars around the tracked star is as large as possible. The threshold spread value $\rho_{spread}$ should therefore be chosen to be consistent with the maximum allowable $\epsilon_{\|}$.

In one embodiment of the present invention, the spread $\rho$ of stars is computed for each star tracker to determine if the spread is at least a minimum threshold value. This can be accomplished, for example using the relationships described in equation (5) above. If the spread does not meet a minimum threshold value for a tracker tracking $N_{max}$ stars, various options are available. For the simplest, the track on star(s) closest to centroid is broken and a new track is establish track on other stars in the star sensor's FOV. This process is repeated until a sufficient spread of stars around the tracked star is obtained. Another option is to continue with CISSAA to establish an attitude estimate of sufficient accuracy to determine a set of ASC stars in the tracker FOV meeting the threshold spread requirement. After that is done, the tracker may be commanded to track those stars, breaking track on some or all of the stars it is currently tracking. CISSA is repeated with the new set of tracked stars.

Next, a correlation between the stars observed by each star sensor and the star catalog entries is determined, as shown in block 506. A reference star sensor is then selected using the correlation between the star observations and the associated star catalog entries for each star sensor, as shown in 508. In one embodiment, the reference star sensor is the sensor having a sufficiently high correlation between the stars observed by the star sensor and the entries in the star sub catalog associated with the star sensor. In one embodiment, the star sensor that is selected to be the reference star sensor is the one tracking the greatest number of identifiable (sufficiently correlated) stars. This is shown in block 508. Then the spacecraft 100 attitude is determined from the measurements made by the reference star sensor, including the observation of the primary star and the observations of the remaining stars, as shown in block 510.

Figure 6A:
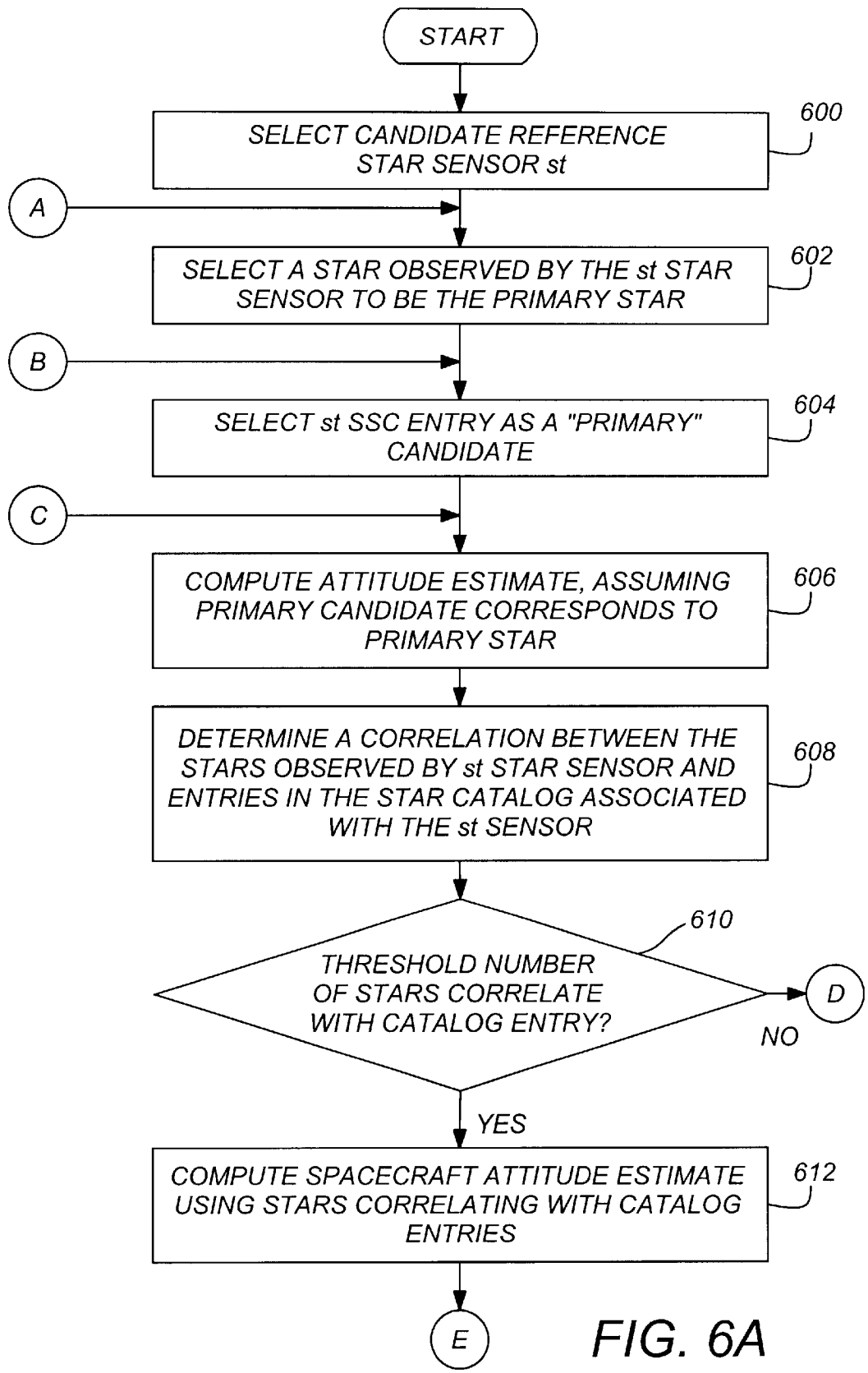
FIGS. 6A–6C are flow charts of the exemplary process steps used in one embodiment of the present invention to determine a correlation between the stars observed by each star sensor and star catalog entries, and to select the reference star sensor.
Figure 6B:
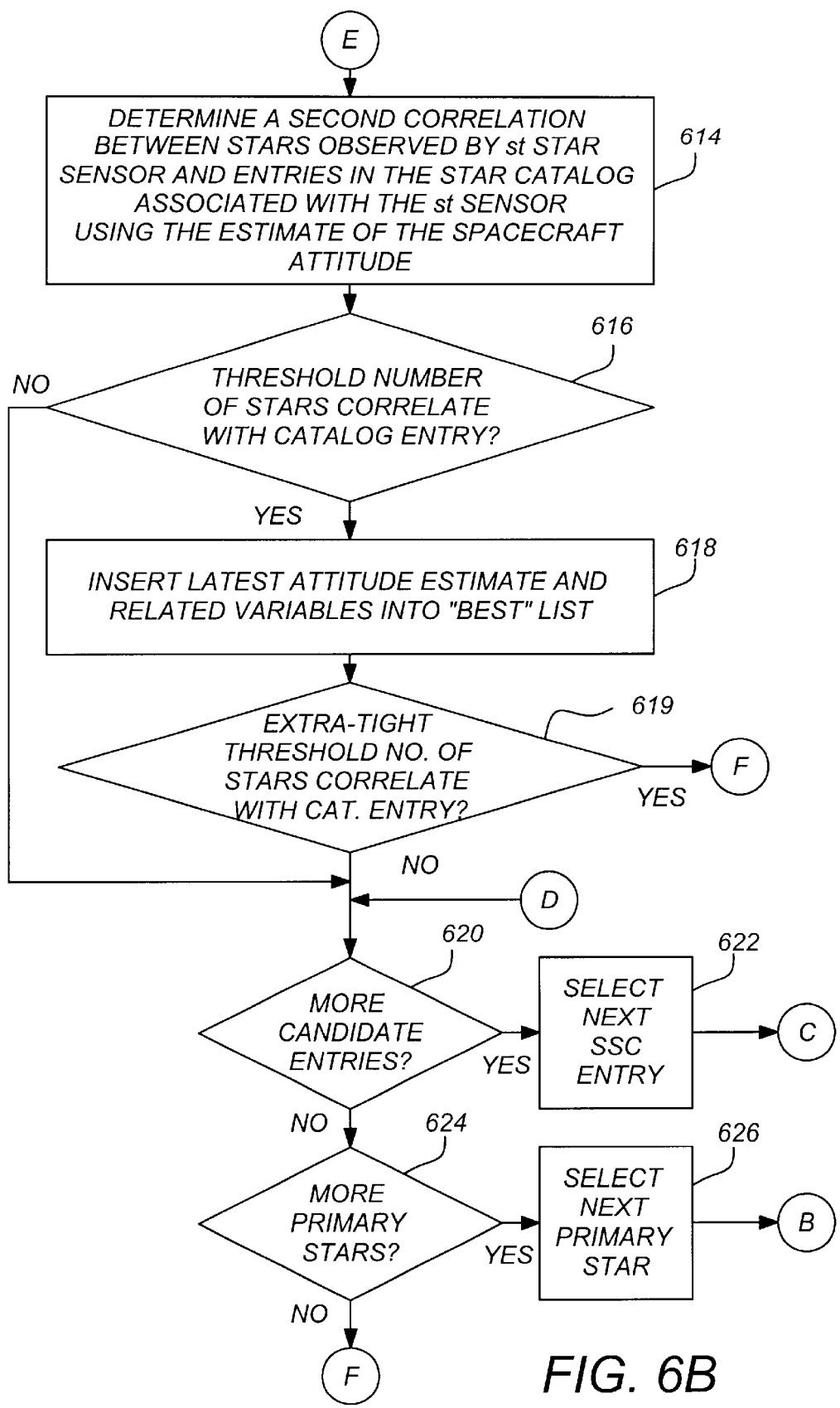
Figure 6C:
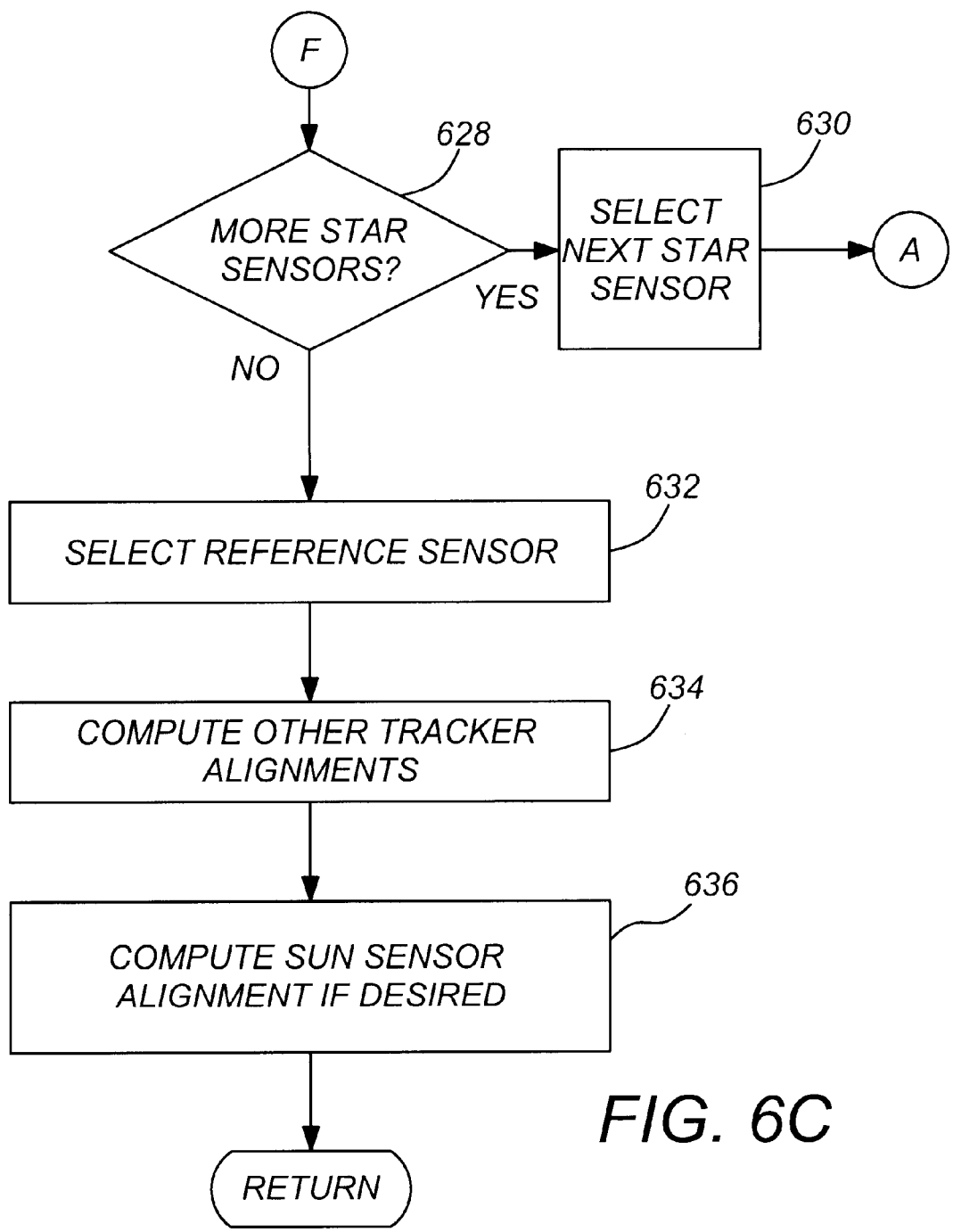

FIGS. 6A–6C are flow charts of the exemplary process steps used in one embodiment of the present invention to determine a correlation between the stars observed by each star sensor and star catalog entries, and to select the reference star sensor. Lists of tracked stars TrackerOutput$_{tracker}$ and TrackedStars$_{tracker}$ wherein ($1 \leq tracker \leq NumST$) are prepared for each star sensor. TrackerOutput$_{tracker}$ and TrackedStars$_{tracker}$ are identical lists of the stars tracked by the star sensor. The lists include star positions, expressed in the star tracker frame, and star magnitudes. The source of the foregoing star position magnitude information is the star sensor 218 output from the star observations (as opposed to the star catalog), and knowledge of the star sensor mounting to the satellite body 102 (and hence, the transform to and from star sensor 218 to spacecraft body coordinates 112). In one embodiment, each list is ordered by magnitude, with the brightest star first.

A star sensor is then selected as a candidate reference star sensor, as shown in block 600. In one embodiment, this candidate reference star sensor the first in an ordered series of star sensors for which a minimum number of stars is observed. In other words, the candidate reference star sensor is the star sensor having an index st, the smallest value for which TrackerOutput$_{st}$ contains at least $N_{local}$ stars. The following initial variables are the set for the candidate reference tracker:

found_attitude(st)←FALSE;

redundant_attitude(st)←FALSE;

Next, a star observed by the st star sensor is designated as the "primary" star, P. This is shown in block 602 In one embodiment, the first star in the TrackedStars$_{st}$ list is designated as the "primary" star. Then, the observed position of the primary star in the reference tracker frame (which was obtained from TrackedStars$_{st}$) is defined as $P_{st}$, and $P_{mag}$ is designated as the instrument magnitude of the primary star P.

Next, at least one of the SSC entries for the candidate reference star tracker is selected as the "primary candidate." This "primary candidate" is essentially a guess as to which of the entries of the star catalog is the primary star. This is illustrated in block 604.

In one embodiment, a list of a plurality of "primary candidates" is created from the SSC entries for the candidate reference star tracker (the entries in SSC$_{st}$). The list of "primary candidates" are stars in SSC$_{st}$ that could (conceivably) be the observed primary star. This list is referred to as Candidates$_{st}$. To qualify for the candidates list, a particular star in the SSC$_{st}$, denoted as star C, with ECI-referenced position $C_{eci}$, and instrument magnitude $C_{mag}$, must satisfy the following magnitude and position conditions.

The star C must have instrument magnitude within $\Delta_{mag}$ of the observed star that has been designated as the primary star. That is $$|C_{mag}-P_{mag}| \leq \Delta_{mag} \quad (8)$$

For many star sensors 218, a typical value of $\Delta_{mag}$ is approximately 0.25. It may well be that the value of $\Delta_{mag}$ is a function of the class of the star C. if this is the case, the entries for each star in the ASC includes information regarding the star class.

The candidate star C must also have a position consistent with that of the observed primary star, given the initial attitude knowledge. This condition will be interpreted depending on the mode.

In sun position knowledge mode, the foregoing position condition requires that the angular separation between the sun 304 position determined by the sun sensor 214, and the primary star position determined by the star sensor 218, matches the angular separation between the sun's ECI position, and star C's ECI position, to within a certain tolerance. The tolerance is the sum of the errors in determining sun and star position in the reference star tracker frame. Thus, in the sun hold mode, this condition can expressed according to equation (9) below.

$$|a \cos(S^A_{body} \cdot DCM^A_{st \to body} P_{st}) - a \cos(S_{eci} \cdot C_{eci})| \leq (\epsilon^A_S + \epsilon_T) \quad (9)$$

In a rough attitude knowledge mode, the position condition requires that the angular separation between star C (expressed in the spacecraft body frame 112, using the initial attitude estimate) and the primary star be within a certain tolerance. The tolerance is the sum of the maximum error in the initial attitude estimate and the error in determining star position in the body frame 112. Thus, in the rough attitude knowledge mode, this condition can be expressed according to equation 10 below.

$$|a \cos(DCM^A_{eci \to body} C_{eci} \cdot DCM^A_{st \to body} P_{st})| \leq (\epsilon^A + \epsilon_T) \quad (10)$$

Next, a spacecraft attitude estimate is computed, assuming that the primary candidate SSC entry C corresponds to the primary star $P_{st}$. This is shown in block 606. This is accomplished by assuming the primary star, $P_{st}$, is the $j^{th}$ star in the candidate primary list Candidates$_{st}$, where j is taken to be 1 upon beginning CISSAA. This assumption may be expressed as follows:

$$P_{body} = DCM_{eci \to body} C_{eci} \quad (11)$$

$$P_{st} = DCM^A_{body \to st} P_{body} \quad (12)$$

Making this assumption, a first approximation of the attitude estimate can be obtained in any mode, using the a priori supplied attitude-related knowledge. This attitude estimate allows an attempt at direct match of the stars observed in the star sensor's FOV 416 with those in the SSC for the candidate reference star sensor (SSC$_{st}$), and hence possibly in the star sensor's FOV 416. Should enough stars be matched, the assumption will be investigated further; otherwise, it will be rejected out-of-hand.

The sun 302 position estimate $S^A_{body}$ may optionally be refined as follows. Given the primary assumption, the angular separation between the Sun 302 and the designated primary star, as determined in the spacecraft body frame 112, will be equal to the angular separation between the Sun 302 and the entry in the SSC for the primary candidate, as determined in the ECI frame. Therefore, $S^A_{body}$ will be replaced with $S^B_{body}$, for as long as the primary assumption is being made, where $S^B_{body}$ will be the unit vector with the minimum possible angular separation from $S^A_{body}$ satisfying the relationship $$S^B_{body} \cdot DCM^A_{st \to body} P_{st} = S_{eci} \cdot C_{eci} \quad (13)$$

It may be shown that $S^B_{body}$ may be obtained by a rotation of $S^A_{body}$, about an axis defined by $S^A_{body} \times DCM^A_{st \to body} P_{st}$, through an angle $\theta$, where:

$$\theta = a \cos(S^A_{body} \cdot DCM^A_{st \to body} P_{st}) - a \cos(S_{eci} \cdot C_{eci}) \quad (14)$$

Given the positional criteria for selection of stars as primary candidates from equation (9), it is noted that:

$$|\theta| \leq \epsilon^A_S + \epsilon_T \quad (15)$$

Also, defining the error, $\epsilon^B_S$, in approximating $S_{body}$ with $S^B_{body}$, analogously to equation (2), $$a \cos(S_{body} \cdot S^B_{body}) \leq \epsilon^B_S \quad (16)$$

It may also be shown that for $\epsilon^A_S$, $\epsilon^B_S$, $\theta \ll 1$ radian (a condition that will be easily satisfied), $$(\epsilon^B_S)^2 \approx (\epsilon^A_S)^2 - \theta^2 \quad (17)$$

At this point, an attitude estimate, represented by direction cosine matrix $DCM^B_{eci \to st}$, may be obtained. This is because $DCM^B_{eci \to st}$ must map $C_{eci}$ to $P_{st}$, and $C_{eci} \times S_{eci}$ to $P_{st} \times DCM^A_{body \to st} S^A_{body}$; as $C_{eci}$ and $S_{eci}$ are linearly independent, a unique $DCM^B_{eci \to st}$ must exist, and may be derived using algorithms which are known in the art, such as the TRIAD algorithm, described in Section 12.2.2 of "Spacecraft Attitude Determination and Control," by Gerald M. Lerner (1978), which is hereby incorporated by reference herein.

Alternatively, in rough attitude knowledge mode, given the primary assumption, the initial attitude estimate, defined by the direction cosine matrix $DCM^A_{eci \to body}$ may be used to calculate $DCM^B_{eci \to st}$. Define:

$$C^A_{body} = DCM^A_{eci \to body} C_{eci} \quad (18)$$

$$C^A_{st} = DCM^A_{body \to st} C^A_{body} \quad (19)$$

Further define $\phi^A$ to be the angular separation between the primary and the primary candidate, calculated assuming the attitude estimate:

$$\phi^A = a \cos(C^A_{st} \cdot P_{st}) = a \cos(C^A_{body} \cdot P_{body}) \quad (20)$$

From equations (11) and (18), $$C^A_{body} \cdot P_{body} = (DCM^A_{eci \to body} C_{eci} \cdot DCM_{eci \to body} C_{eci}) \quad (21)$$

Therefore, from equations (3) and (20), $$\phi^A \leq \epsilon^A. \quad (22)$$

By Euler's Theorem, the true (unknown) attitude, represented by $DCM_{eci \to body}$ may be obtained from the initial attitude estimate, represented by $DCM^A_{eci \to body}$, through a single rotation through an angle, $\phi$, about some (unknown) axis. Given the primary assumption, $DCM_{eci \to body}$, may be obtained from $DCM^A_{eci \to body}$ through two successive rotations, both about specific axes.

First, a rotation, through the minimum angle possible, such that, for the attitude obtained, $C^A_{body}$ maps into $P_{body}$. This rotation will be through angle $\phi^A$, about an axis perpendicular to both $C^A_{body}$ and $P_{body}$, i.e., an axis parallel to $C^A_{body} \times P_{body}$. The attitude resulting from this rotation will be represented by the direction cosine matrix $DCM^B_{eci \to body}$.

As $DCM^B_{eci \to body}$ will map $C_{eci}$ to $P_{body}$, as will $DCM_{eci \to body}$, given the primary assumption, the true attitude can be obtained through a second rotation, with this one about $P_{body}$, through an (unknown) angle $\phi^B$.

From equation (3), $\phi^A \leq \epsilon^A \leq 1$ radian. Since the rotations described above are both small angle rotations about perpendicular axes, the relationship described in equation (23) applies as follows:

$$(\phi^B)^2 \approx \phi^2 - (\phi^A)^2 \leq (\epsilon^A)^2 - (\phi^A)^2 \quad (23)$$

Therefore, given the primary assumption, the attitude estimate represented by $DCM^B_{eci \to body}$, may be used to replace (refine) the initial attitude estimate, represented by $DCM^A_{eci \to body}$. When this is done, the resulting accuracy of the estimate will be $\epsilon^B$, to be used in place of $\epsilon^A$, where $(\epsilon^B)^2 \equiv (\epsilon^A)^2 - (\phi^A)^2$.

Referring again to FIG. 6A, a correlation between the stars observed by the candidate reference star tracker and the corresponding entries in the star sub catalog SSC associated with the star sensor 218 is determined. This is shown in block 608. In one embodiment, this is accomplished by attempting a "loose" modified direct match on the star sensor outputs, using the primary assumption (that the "primary star" observed by the candidate reference star sensor 218 corresponds to the "primary candidate" in the SSC for the star sensor 218) and latest attitude estimate represented by direction cosine matrix computed above, $DCM^B_{eci \to st}$. (This match is referred to as "loose" because relatively large errors in the latest attitude estimate force large tolerances in parameters to be matched.)

In one embodiment, the present invention uses modified "direct matching" for star identification. Under this method, an observed star is identified as a catalog entry if the entry uniquely satisfies the following:

1) The entry has an instrument magnitude within a certain value (the magnitude tolerance, $\tau_{mag}$) of the observed star's instrument magnitude;
2) The entry and the position of the observed star in the ECI frame (calculated using $DCM^B_{st \to eci}$) have an angular separation of no more than a certain amount (the position tolerance, $\tau_{pos}$). This criteria verifies that the attempted match is consistent with the expected error.
3) The separation between the observed star and $P_{st}$ match the separation between the catalog entry and $C_{eci}$, to within a certain value (hereinafter referred to as a baseline tolerance, $\tau_{sep}$). This criteria verifies that the attempted match is consistent with the fact that the error is about the expected axis.

At this point, an attempt is made to form a modified direct match with each star in TrackedStars$_k$ wherein ($1 \leq k \leq$ NumST). This is accomplished as follows:

As defined earlier, the parameter $\epsilon_T$ is defined as the inherent tracker error (typically, about 15 arc-seconds). The parameter $\epsilon_k$ is defined as the star tracker angular position error. Note that $\epsilon_k = \epsilon_T$, when k is the reference tracker (i.e., k=st), and $\epsilon_k = \epsilon_T + \epsilon_C$, otherwise. Then the tolerances are taken to be:

$$\tau_{mag} \leftarrow \Delta_{mag} \qquad (24)$$

$$\tau_{pos} \leftarrow 2\epsilon_k + \epsilon^A_S \text{(Sun-Hold) and } \tau_{pos} \leftarrow 2\epsilon_k + \epsilon^A \text{(Rough Attitude)} \qquad (25)$$

$$\tau_{sep} \leftarrow 2\epsilon_k \qquad (26)$$

The parameter $M^{loose}_{local}$ is defined to be the number of stars from TrackedStars$_{st}$ for which a modified direct match is established and $M^{loose}_{total}$ is defined to be the number of stars from all of the TrackedStars lists for which a direct match is established.

Returning again to FIG. 6A, a determination is made as to whether the correlation between the stars observed by the star sensor and the entries in the associated star catalog is sufficient to warrant further analysis of the current set of tracked stars based on the primary assumption. In one embodiment, this is accomplished by determining whether threshold numbers of stars observed by the star sensors can be identified as entries in the associated star catalog, as shown in block 610. If $M^{loose}_{local}$ equals or exceeds some threshold, defined to be $N^{loose}_{local}$, and $M^{loose}_{total}$ equals or exceeds some threshold, defined to be $N^{loose}_{total}$, the primary assumption has been supported (although not validated), and is investigated further. Otherwise, the primary assumption is abandoned, and the above processing is performed for the next candidate SSC entry, by routing processing to block 620.

It is important to select the proper value for the constants $N^{loose}_{local}$ and $N^{loose}_{total}$. These constants are a function of the performance characteristics star sensors 218. Given trackers capable of simultaneously tracking up to $N_{max}$ stars, the following criteria applies:

$$N^{loose}_{local} \leq N_{max}; \qquad (27)$$

$$N^{loose}_{local} \geq 2; \qquad (28)$$

$$N^{loose}_{total} \geq N^{loose}_{local}; \qquad (29)$$

$$N^{loose}_{total} \geq 4; \text{ and} \qquad (30)$$

$$N^{loose}_{total} \leq N_{max} \qquad (31)$$

If the criteria of equation (28) were not applied, acquisition could be performed with one star identified the reference star sensor, and multiple stars identified by another star sensor. Acquisition in such a case is susceptible to large errors (~1°) representing a rotation of the true attitude about an axis parallel (or nearly parallel) to the other tracker's boresight. Because of (rare) cases where three stars of roughly equal magnitude are collinear, and evenly spaced, (e.g., Orion's Belt), $N^{loose}_{local}$ is preferably set to 3.

With respect to the criteria of equation (30), it is noteworthy that there are cases where two widely separated triplets of stars exist, where stars in one triplet match, in instrument magnitude and angular separation from the other stars, the corresponding star in the other triplet. Setting $N^{loose}_{total} > 3$ helps to avoid erroneous acquisition. The criteria of equation (31) is applied so that acquisition may proceed with only one tracker tracking stars.

Returning again to FIG. 6A, an second, and typically improved spacecraft 100 attitude estimate is computed using observed stars from the reference tracker st correlating with the catalog entries. This is illustrated in block 612.

At this point, the $M^{loose}_{local}$ ($\geq N^{loose}_{local} \geq 2$) stars have been identified in the FOV 416 of the (at this point, candidate) reference star sensor 218, st. This identification is a mapping of at least two vectors, expressed in the candidate reference star sensor frame 412, to vectors expressed in the ECI coordinate frame 312. An attitude, represented by direction cosine matrix $DCM^C_{eci \to st}$, can be determined from these vectors. If $M^{loose}_{local} = 2$, the problem of determining the direction cosine matrix is equivalent to the one solved in above, and the TRIAD algorithm may again be used.

If $M^{loose}_{local} \geq 3$, an optimization algorithm may be used to determine the "best" attitude estimate; such algorithms are discussed in various texts (e.g., Chapter 11 of James R. Wertz' Spacecraft Attitude Determination and Control, which is hereby incorporated by reference herein). In one embodiment, a Quaternion Estimator (QUEST) algorithm, as described in Proceedings, AIAA Guidance and Control Conference entitled "Approximate Algorithms for Fast Optimal Attitude Computation," by M. D. Shuster (1978), which is hereby incorporated by reference.

In either case, an attitude estimate has now been formulated that does not depend on the initial attitude-related information (which may be relatively inaccurate). Instead, it is derived solely from output of the reference star sensor 218. The error in the estimate is a function of $M^{loose}_{local}$, star sensor position measurement accuracy, and star sensor 218 orientation. Because of the high accuracy of tracker measurements, the attitude error with respect to axes perpendicular to the star sensor boresight 414 is expected to be much smaller than the corresponding error associated with previous estimates. This estimate, however, depends on the star identification, which is confirmed using the steps below.

Referring to FIG. 6B, a second correlation between the stars observed by the candidate star sensor 218 and the entries in the star sub catalog SSC associated with the candidate star sensor 218 is determined using the improved estimate of the spacecraft 100 attitude.

At this point, an attempt is made to form a modified direct match with each star in TrackerOutput$_k$ wherein ($1 \leq k \leq$ NumST). In one embodiment, processing is performed on TrackerOutput$_k$, the complete list of stars observed by tracker k (not TrackedStars$_k$, a subset of that list.) $\epsilon_k$ is defined as the star tracker angular position error; $\epsilon_k = \epsilon_T$, when k is the reference tracker (i.e., k=st) and as $\epsilon_k = \epsilon_T + \epsilon_C$, otherwise. Because the matching criteria here are much more rigorous than those of the match done earlier, this is a "tight" match. In this case, the tolerances are taken to be:

$$\tau_{mag} \leftarrow \Delta_{mag} \quad (32)$$

$$\tau_{pos} \leftarrow 2\epsilon_k \quad (33)$$

$$\tau_{sep} \leftarrow 2\epsilon_k \quad (34)$$

$M^{tight}_{local}$ is defined to be the number of stars from TrackerOutput$_{st}$ for which a modified direct match is established, and $M^{tight}_{total}$ is defined to be the number of stars from all of the TrackerOutput lists for which a direct match is established.

Returning to FIG. 6B, the second correlation is examined to determine if there is sufficient correlation between the star sensor 218 measurements and the associated catalog entries. In one embodiment, this is accomplished by determining if a sufficient number of stars correlate with the associated catalog entry, as shown in block 616. If a sufficient number of "tight" matches is obtained, further investigation based upon the primary assumption (that the star tracked by the star sensor corresponded with the primary candidate entry in the SSC) is performed. This is accomplished by inserting the latest attitude estimate and related variables into a "best" list.

Hence, if $M^{tight}_{local} \geq N^{tight}_{local}$, and $M^{tight}_{total} \geq N^{tight}_{total}$ (where $N_{tightlocal}$ and $N^{tight}_{total}$ are pre-set constants), the primary assumption has been further supported (although not yet validated). Otherwise, the primary assumption is abandoned, and control jumps to block 620. If the primary assumption has been supported, a "best" list, IdentifiedStars$_{st,k}$, is defined. IdentifiedStars$_{st,k}$ includes an entry for each star identified during the previous step, tracked by tracker k where ($1 \leq k \leq$ NumST). In one embodiment, each entry includes: an index number in TrackerOutput$_k$ of the tracked star and the catalog number in the ASC of the identified star.

The values of $N^{tight}_{local}$ and $N^{tight}_{total}$ are key factors in the performance of this algorithm. The choice of $N^{tight}_{local}$ and $N^{tight}_{total}$ is made using the same relationships and criteria defined in equations (27)–(31) and the accompanying discussion. The criteria are chosen so that $N^{tight}_{local} \leq N^{tight}_{total}$ and $N^{tight}_{local} \leq N^{tight}_{total}$. This is because the current attitude estimate is more accurate than the estimate developed in blocks 612 and 606 and using TrackerOutput instead of TrackedStars should result in an equal or larger set of possible matches.

Next, a determination is made as to whether the attitude estimate and star identifications are acceptable. This is accomplished by computing the centroid and spread of the identified stars tracked by the reference star sensor using equations (4) and (5). Using these values, the estimated error about the axis perpendicular to the centroid, $\epsilon_\perp$, and the estimated upper bound about an axis parallel to the centroid, $\epsilon_\parallel$, may be calculated, using equations (6) and (7). If either of these values exceed a particular threshold, the attitude estimate and the primary assumption are rejected and processing is passed to block 620.

If $M^{tight}_{local} \geq N^{X\text{-}tight}_{local}$ (where $N^{X\text{-}tight}_{local}$ is a pre-set constant), i.e., at least $N^{X\text{-}tight}_{local}$ stars have been identified in the FOV 416 of the candidate reference star sensor, the primary assumption is considered validated, and the attitude estimate, as represented by $DCM^C_{eci \to st}$ is accepted. In one embodiment, the value of $N^{X\text{-}tight}_{local}$ is set to four. That is, if four stars in the FOV 416 are observed and these observations are adequately correlated or matched with the star sub catalog for the candidate reference star sensor based upon the latest attitude estimate, the primary assumption is validated. This is because the chance of that estimate being incorrect is negligible.

Next, the following parameters are set:

found_attitude (st) → TRUE redundant_attitude (st) ← FALSE best_$\epsilon_{\parallel(st)} \leftarrow \epsilon_\parallel$;

best_$\epsilon_\perp$(st) ← $\epsilon_\perp$;

best_$\mu_{body}$(st) ← $\mu_{body}$;

best_DCM$_{eci \to st}$(st) ← DCM$^C_{eci \to st}$;

best_IdentifiedStars(st,k) ← IdentifiedStars$_{st,k}$($1 \leq k \leq$ NumST);

best_N_IdentifiedStars(st) ← $M^{tight}_{local}$ and processing jumps to block 628. At this point, all computations for the case of a particular star sensor 218 are completed. Another star sensor is then selected 630 and the foregoing computations are repeated for that star sensor. In one embodiment, this is accomplished by setting the index st to the smallest value (yet greater than the current value) for which TrackerOutput$_{st}$ includes at least $N^{tight}_{local}$ stars and returning processing to block 602.

Otherwise, if $M^{tight}_{local} < N^{X\text{-}tight}_{local}$, then processing depends on whether the found attitude flag for this star sensor has been set. If the found_attitude flag for this tracker is not set, the following parameters are set:

found_attitude(st) ← TRUE best_$\epsilon_{\parallel(st)} \leftarrow \epsilon_\parallel$;

best_$\epsilon_\perp$(st) ← $\epsilon_\perp$;

best_$\mu_{body}$(st) ← $\mu_{body}$;

best_DCM$_{eci \to st}$(st) ← DCM$^C_{eci \to st}$;

best_IdentifiedStars(st,k) ← IdentifiedStars$_{st,k}$($1 \leq k \leq$ NumST);

best_N_IdentifiedStars(st) ← $M^{tight}_{local}$

If the found_attitude flag for this tracker is already set, there are at least two "validated" primary assumptions and associated attitudes. If the current (from the star sensor indicated by the current st index) attitude estimate differs from the attitude referred to as best_DCM$_{eci \to st}$ for this star sensor by more than a certain threshold, set the flag redundant_attitude(st) → TRUE. This indicates that there are conflicting indications of the spacecraft 110 attitude.

If the current attitude estimate differs from the attitude referred to as the best_DCM$_{eci \to st}$ by less than or equal to the threshold and the current $\epsilon_\parallel \leq$ best_$\epsilon_\parallel$(st), the following parameters are set:

best_$\epsilon_{\|(st)} \leftarrow \epsilon_\|$;

best_$\epsilon_\perp(st) \leftarrow \epsilon_\perp$;

best_$\mu_{body}(st) \leftarrow \mu_{body}$;

best_$DCM_{eci \to st}(st) \leftarrow DCM^C_{eci \to st}$;

best_IdentifiedStars(st,k) $\leftarrow$ IdentifiedStars$_{st,k}$(1 $\leq$ k $\leq$ NumST);

best_N_IdentifiedStars(st) $\leftarrow M^{tight}_{local}$

Returning again to FIG. 6B, at this point, we have completed all calculations required for this primary candidate. If there are more star sub catalog entries (if there are more than j elements in Candidates$_{st}$), j is incremented, and, the next SSC entry is selected as the candidate entry, processing returns to block 606, and the process outlined above is repeated for the next candidate star sub catalog entry.

If processing does not return to block 606, then at this point, we have completed all calculations required for the current primary star. As indicated in block 624, if there are more primary stars observed by the star sensor 218, a new primary star is selected, and processing is returned to block 604, so that the foregoing process steps to correlate the stars observed by the star sensor with the new primary star assumption can be accomplished. In one embodiment, this is performed by deleting the current primary (first entry) from the TrackedStars$_{st}$ list. If there are still $N^{loose}_{local}$ stars in TrackedStars$_{st}$ and $N^{loose}_{local}$ stars in all of the TrackedStars lists combined, processing returns to block 604.

Referring to FIG. 6B, at this time, all computations required for the candidate star tracker have been completed. The process now moves on to the next star tracker tracking a sufficient number of stars, if one exists. Block 628 tests to determine if there are more star sensors. If so, the next star sensor is selected 630, and processing returns to block 602. In one embodiment, this is accomplished by setting st to the smallest value greater than its current value, for which TrackerOutput$_{st}$ contains at least $N^{tight}_{local}$ stars. If such a star tracker index st exists, processing is transferred to block 602. If no such star tracker index st exists, there are no more star sensors 218 that are observing a sufficient number of stars, and processing proceeds to block 632.

Block 632 selects, from among the star sensors, a reference star sensor, and block 634 computes the misalignment of the other star sensors. Further, block 634 returns processing to block 510, wherein the spacecraft 100 attitude is determined. In one embodiment, the misalignment of the other star sensors is computed from the measurements from the reference star sensor alone. In another embodiment, the misalignment of the star sensors is computed using the measurements from a plurality of star sensors. In this case, a best estimate of the spacecraft 100 attitude is computed from at least two of the star sensors and used to estimate the misalignment errors. This estimate could be improved with the use of three star sensors, but the improvement is small in comparison to the improvement obtained using two star sensors.

In one embodiment, this is accomplished as follows. If, for at least one star sensor, the found_attitude flag is set to the TRUE state, and redundant_attitude flag is set FALSE, a valid attitude estimate exists. If only one such tracker meets that criterion, a tracker with tracker index best_st, is then selected as the reference tracker as follows, Reference tracker index $\leftarrow$ best_st $\mu_{body} \leftarrow$ best_$\mu_{body}$(best_st)

$DCM'_{eci \to body} \leftarrow DCM^A_{best\_st \to body}$best_$DCM_{eci \to st}$(best_st);

and the errors in the spacecraft attitude estimate are determined as follows:

$\epsilon_\| \leftarrow$ best_$\epsilon_\|$(best_st);

$\epsilon_\perp \leftarrow$ best_$\epsilon_\perp$(best_st);

$DCM'_{tracker \to body} \leftarrow DCM^A_{tracker \to body}$ for all trackers;

IdentifiedStars$_{st,k}$(1 $\leq$ k $\leq$ NumST) $\leftarrow$ best_IdentifiedStars(best_st,k);

If there is more than one tracker for which the found_attitude flag is TRUE, and redundant_attitude flag is FALSE, more than one choice exists for a reference tracker. For the preferred embodiment, the reference tracker is chosen to be the tracker with index best_st such that best_IdentifiedStars (best_st, bests) $\geq$ best_IdentifiedStars (k, k) wherein (1 $\leq$ k $\leq$ NumST). That is, the reference tracker will be the one tracking the most identifiable stars. In this case, the following parameters are set:

Reference tracker index $\leftarrow$ best_st; and $\mu_{body} \leftarrow$ best_$\mu_{body}$(best_st)

$DCM'_{eci \to body} \leftarrow DCM^A_{best\_st \to body}$best_$DCM_{eci \to st}$(best_st);

and the errors in the attitude estimate are set to:

$\epsilon_\| \leftarrow$ best_$\epsilon_\|$(best_st); and $\epsilon_\perp \leftarrow$ best_$\epsilon_\perp$(best_st);

For all star sensors with index k (1 $\leq$ k $\leq$ NumST) such that found_attitude (k) is TRUE and redundant_attitude is FALSE, the following relationship $DCM'_{k \to body} \leftarrow DCM'_{eci \to body}$best_$DCM_{st \to eci}$(k)

applies while for all star sensors with index k (1 $\leq$ k $\leq$ NumST) such that found_attitude (k) is FALSE or redundant_attitude is TRUE, the following relationship applies:

$DCM'_{k \to body} \leftarrow DCM^A_{k \to body}$.

Finally, the following parameter is also set:

IdentifiedStars$_{st,k}$(1 $\leq$ k $\leq$ NumST) $\leftarrow$ best_IdentifiedStars(best_st,k);

If a sun sensor is currently being used to determine sun position in the body frame, and sun position in the ECI frame is known (in one embodiment, due to ephemeris calculations, conducted either on-board the spacecraft, or on ground), sun sensor misalignment may be calculated in a similar fashion.

If there is no tracker for which the found_attitude flag is TRUE, and the redundant_attitude flag is FALSE, no valid attitude estimate exists. CISSAA has failed to acquire an attitude. Track must be broken on the observed stars, tracks on different stars must be established, and processing will return to block 502.

CONCLUSION

This concludes the description of the preferred embodiments of the present invention. In summary, the present invention describes a method, apparatus, for determining the attitude of a spacecraft having at least one star sensor.

The method comprises the steps of preparing, for each star sensor, an associated star catalog having an entry describing star parameters for each star potentially observable by the star sensor. The determination of which stars are potentially observable by the star sensor is performed using an estimate of the satellite attitude. A correlation is then determined between the stars observed by each star sensor with the associated star catalog entries. A reference star sensor is selected as the star sensor tracking a primary star having the highest correlation between the stars observed by the star sensor and the entries in the star catalog associated with the star sensor. Finally, the spacecraft attitude is determined from the primary star and remaining star observations by the reference star sensor.

The present invention provides a procedure for estimating attitude of spacecraft equipped with at least one star tracker, capable of simultaneously tracking multiple ($N_{max}$) stars ($N_{max}$~5). This procedure determines attitude using identified ("matched") stars observed by the star sensor(s) as entries in a star catalog, which includes a list of star positions, instrument magnitudes (the magnitude of a star as observed by the star sensor's Charge-Coupled Device [CCD]), and if necessary, star classes.

The present invention can be implemented in the satellite 100 or in an associated ground station. Unlike existing systems, the present invention will accept and use attitude-related information is supplied. Further, if such information is not provided, the present invention will still provide an attitude reference, but less efficiently.

The present invention is especially useful in cases where a priori attitude information is available, and memory is limited. This information can be obtained from a known body-referenced vector corresponds to a known vector defined with respect to the Earth-Centered Inertial (ECI) frame, to within FAs, or a rough estimate of the attitude, accurate to within $\epsilon^A$. The present invention can also be practiced with no initial attitude-related information, by taking $\epsilon^A$ to be 180°.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of determining an attitude of a spacecraft having at least one star sensor, comprising the steps of:
   preparing for each star sensor, an associated star catalog having an entry describing star parameters for each star potentially observable by the star sensor from a priori attitude-related information;
   determining a correlation between the star observations from each star sensor and the associated star catalog entries;
   selecting a reference star sensor using the correlation between the star observations and the associated catalog entries; and
   determining the spacecraft attitude from the reference star sensor star observations.

2. The method of claim 1, wherein the reference star sensor is selected as the star sensor having the highest number of observed stars correlated with the associated star catalog entries.

3. The method of claim 1, wherein the reference star sensor is selected as the star sensor having the highest correlation between stars observed by the star sensor and the entries in the star catalog associated with the star sensor.

4. The method of claim 1, further comprising the step of determining each star potentially observable by each star sensor.

5. The method of claim 1, wherein the step of determining each star potentially observable by the star sensor comprises the steps of:
   obtaining an estimate of the orientation of each star sensor with respect to a spacecraft body reference frame;
   determining the stars potentially within the field of view (FOV) of the star sensor from the estimate of the orientation of each star sensor and the a priori attitude-related information, and
   determining the stars potentially within the FOV of the star sensor to be the stars potentially observable by the star sensor.

6. The method of claim 1, wherein the a priori attitude-related information is obtained from a sensor.

7. The method of claim 1, wherein the a priori attitude-related information is an attitude estimate.

8. The method of claim 1, wherein the step of determining a correlation between the star observations from each star sensor and the associated star catalog entries comprises the steps of:
   (a) selecting a candidate reference star sensor from the plurality of star sensors;
   (b) selecting one of the stars observed by the candidate reference star sensor as a primary star;
   (c) associating the primary star with a candidate star catalog entry from the star catalog associated with the candidate reference star sensor;
   (d) determining a correlation between the stars observed by the candidate reference star sensor and the entries in the star catalog associated with the candidate reference star sensor;
   (e) selecting another candidate star catalog entry from the star catalog associated with the candidate reference star sensor and repeating step (d) if the stars observed by the candidate reference star sensor do not sufficiently correlate with the entries in the star catalog associated with the candidate reference star sensor;
   (f) selecting the primary star as another one of the stars tracked by the candidate reference star sensor and repeating steps (c)–(e) if the stars observed by the candidate reference star sensor do not sufficiently correlate with the entries in the star catalog associated with the candidate reference star sensor; and
   (g) repeating steps (b)–(f) for another candidate reference star sensor from the plurality of star sensors; and
   (h) repeating steps (a)–(g) for each of the plurality of star sensors.

9. The method of claim 8, wherein the step of determining a correlation between the stars observed by the candidate reference star sensor and the entries in the star catalog associated with the candidate reference star sensor comprises the steps of:

(i) determining a first correlation between the stars observed by the candidate reference star sensor and the entries in the star catalog associated with the candidate reference star sensor;

(j) selecting another candidate star catalog entry from the star catalog associated with the candidate reference star sensor and repeating step (i) if the first correlation between the stars observed by the candidate reference star sensor and the entries in the star catalog associated with the candidate reference star sensor is insufficient;

(k) generating an estimate of the spacecraft attitude according to the candidate reference star sensor and star observations if the first correlation between the stars observed by the candidate reference star sensor and the entries in the star catalog associated with the candidate reference star sensor is sufficient; and (l) determining a second correlation between the stars observed by the candidate reference star sensor and the entries in the star catalog associated with the candidate reference star sensor using the estimate of the spacecraft attitude.

10. The method of claim 1, further comprising the step of estimating the alignment of the star sensors.

11. An apparatus for determining an attitude of a spacecraft having at least one star sensor, comprising the steps of:

means for preparing for each star sensor, an associated star catalog having an entry describing star parameters for each star potentially observable by the star sensor from a priori spacecraft attitude-related information;

means for determining a correlation between the star observations from each star sensor and the associated star catalog entries;

means for selecting a reference star sensor using the correlation between the star observations and the associated catalog entries; and means for determining the spacecraft attitude from the reference star sensor star observations.

12. The method of claim 11, wherein the reference star sensor is selected as the star sensor having the highest number of observed stars correlated with the associated star catalog entries.

13. The method of claim 11, wherein the reference star sensor is selected as the star sensor having the highest correlation between stars observed by the star sensor and the entries in the star catalog associated with the star sensor.

14. The apparatus of claim 11, further comprising means for determining each star potentially observable by each star sensor.

15. The apparatus of claim 11, wherein the step of determining each star potentially observable by the star sensor comprises:

means for obtaining an estimate of the orientation of each star sensor;

means for determining the stars potentially within the field of view (FOV) of the star sensor from the estimate of the attitude of each star sensor; and means for determining the stars potentially within the FOV of the star sensor to be the stars potentially observable by the star sensor.

16. The apparatus of claim 11, wherein the a priori attitude-related information is obtained from a sensor.

17. The apparatus of claim 11, wherein the a priori attitude-related information is an attitude estimate.

18. The apparatus of claim 11, further comprising means for estimating the alignment of the sensor.

19. The apparatus of claim 11, wherein the means for determining a correlation between the star observations from each star sensor and the associated star catalog entries comprises:

means for selecting a candidate reference star sensor from the plurality of star sensors;

means for selecting one of the stars observed by the candidate reference star sensor as a primary star;

means for associating the primary star with a candidate star catalog entry from the star catalog associated with the candidate reference star sensor;

means for determining a correlation between the stars observed by the candidate reference star sensor and the entries in the star catalog associated with the candidate reference star sensor;

means for selecting another candidate star catalog entry from the star catalog associated with the candidate reference star sensor if the stars observed by the candidate reference star sensor do not sufficiently correlate with the entries in the star catalog associated with the candidate reference star sensor;

means for selecting the primary star as another one of the stars tracked by the candidate reference star sensor if the stars observed by the candidate reference star sensor do not sufficiently correlate with the entries in the star catalog associated with the candidate reference star sensor.

20. The apparatus of claim 19, wherein the means for determining a correlation between the stars observed by the candidate reference star sensor and the entries in the star catalog associated with the candidate reference star sensor comprises:

means for determining a first correlation between the stars observed by the candidate reference star sensor and the entries in the star catalog associated with the candidate reference star sensor;

means for selecting another candidate star catalog entry from the star catalog associated with the candidate reference star sensor if the first correlation between the stars observed by the candidate reference star sensor and the entries in the star catalog associated with the candidate reference star sensor is insufficient;

means for generating an estimate of the spacecraft attitude according to the candidate reference star sensor and star observations if the first correlation between the stars observed by the candidate reference star sensor and the entries in the star catalog associated with the candidate reference star sensor is sufficient; and means for determining a second correlation between the stars observed by the candidate reference star sensor and the entries in the star catalog associated with the candidate reference star sensor using the estimate of the spacecraft attitude.

21. A program storage device, readable by a computer, tangibly embodying at least one program of instructions executable by the computer to perform method steps of determining an attitude of a spacecraft having at least one star sensor, the method steps comprising the steps of:

preparing for each star sensor, an associated star catalog having an entry describing star parameters for each star potentially observable by the star sensor from a priori attitude-related information;

determining a correlation between the star observations from each star sensor and the associated star catalog entries;

selecting a reference star sensor using the correlation between the star observations and the associated catalog entries; and determining the spacecraft attitude from the reference star sensor star observations.

22. The program storage device of claim 21, wherein the reference star sensor is selected as the star sensor having the highest number of observed stars correlated with the associated star catalog entries.

23. The program storage device of claim 21, wherein the reference star sensor is selected as the star sensor having the highest correlation between stars observed by the star sensor and the entries in the star catalog associated with the star sensor.

24. The program storage device of claim 21, wherein the method steps further comprise the method step of determining each star potentially observable by each star sensor.

25. The program storage device of claim 21, wherein the method step of determining each star potentially observable by the star sensor comprises the method steps of:

obtaining an estimate of the orientation of each star sensor with respect to a spacecraft body reference frame;

determining the stars potentially within the field of view (FOV) of the star sensor from the estimate of the orientation of each star sensor and the a priori attitude-related information, and determining the stars potentially within the FOV of the star sensor to be the stars potentially observable by the star sensor.

26. The program storage device of claim 21, wherein the a priori attitude-related information is obtained from a sensor.

27. The program storage device of claim 21, wherein the a priori attitude-related information is an attitude estimate.

28. The program storage device of claim 21, wherein the method step of determining a correlation between the star observations from each star sensor and the associated star catalog entries comprises the method steps of:

(a) selecting a candidate reference star sensor from the plurality of star sensors;

(b) selecting one of the stars observed by the candidate reference star sensor as a primary star;

(c) associating the primary star with a candidate star catalog entry from the star catalog associated with the candidate reference star sensor;

(d) determining a correlation between the stars observed by the candidate reference star sensor and the entries in the star catalog associated with the candidate reference star sensor;

(e) selecting another candidate star catalog entry from the star catalog associated with the candidate reference star sensor and repeating step (d) if the stars observed by the candidate reference star sensor do not sufficiently correlate with the entries in the star catalog associated with the candidate reference star sensor;

(f) selecting the primary star as another one of the stars tracked by the candidate reference star sensor and repeating steps (c)–(e) if the stars observed by the candidate reference star sensor do not sufficiently correlate with the entries in the star catalog associated with the candidate reference star sensor; and (g) repeating steps (b)–(f) for another candidate reference star sensor from the plurality of star sensors; and (h) repeating steps (a)–(g) for each of the plurality of star sensors.

29. The program storage device of claim 28, wherein the method step of determining a correlation between the stars observed by the candidate reference star sensor and the entries in the star catalog associated with the candidate reference star sensor comprises the method steps of:

(i) determining a first correlation between the stars observed by the candidate reference star sensor and the entries in the star catalog associated with the candidate reference star sensor;

(j) selecting another candidate star catalog entry from the star catalog associated with the candidate reference star sensor and repeating step (i) if the first correlation between the stars observed by the candidate reference star sensor and the entries in the star catalog associated with the candidate reference star sensor is insufficient;

(k) generating an estimate of the spacecraft attitude according to the candidate reference star sensor and star observations if the first correlation between the stars observed by the candidate reference star sensor and the entries in the star catalog associated with the candidate reference star sensor is sufficient; and (l) determining a second correlation between the stars observed by the candidate reference star sensor and the entries in the star catalog associated with the candidate reference star sensor using the estimate of the spacecraft attitude.

30. The program storage device of claim 21, wherein the method steps further comprise the method step of estimating the alignment of the star sensors.

31. An apparatus for determining the attitude of a spacecraft, comprising:

at least one star sensor;

a computer, communicatively coupled to the star sensor, the computer for preparing and storing a star catalog for each star sensor from a priori spacecraft attitude-related information, each star catalog having an entry describing star parameters for each star potentially observable by the star sensor, for determining a correlation between the stars observed by each star sensor and the associated catalog entries, for selecting a reference star sensor using the correlation between the star observations and the associated catalog entries, and for determining the spacecraft attitude from the reference star sensor star observations.

32. The apparatus of claim 31, further comprising at least one additional star sensor.

33. The apparatus of claim 31, further comprising a sensor for providing the a priori spacecraft attitude-related information.

* * * * *